UNITED STATES PATENT OFFICE.

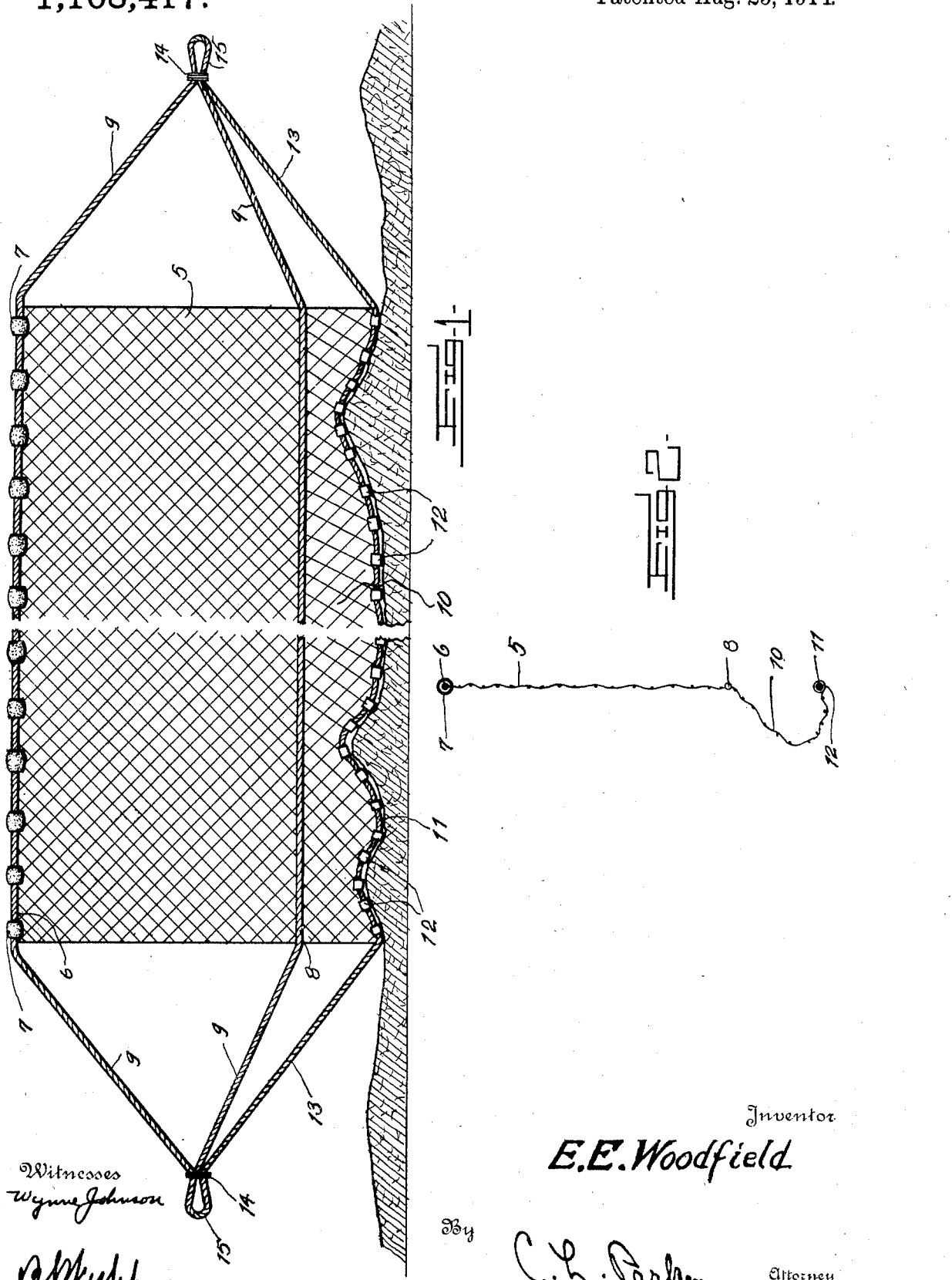

ERNEST E. WOODFIELD, OF ASTORIA, OREGON.

DRAG-SEINE.

1,108,417.

Specification of Letters Patent.     Patented Aug. 25, 1914.

Application filed April 24, 1914. Serial No. 834,085.

*To all whom it may concern:*

Be it known that I, ERNEST E. WOODFIELD, a citizen of the United States, residing at Astoria, in the county of Clatsop and State of Oregon, have invented certain new and useful Improvements in Drag-Seines, of which the following is a specification.

My invention relates to improvements in drag-seines and has particular reference to a drag-seine provided with a lower permanently longitudinally full or loose apron or extension, to engage with the bottom of a river or the like and readily conform to the curvature thereof for preventing the passage of fish between the lower longitudinal edge of the drag-seine and the bottom of the river or the like, in operating the drag-seine, and for preventing the drag-seine from being unduly caught upon or by obstructions in or near the bottom of the river or the like.

An important object of the invention is to provide means of the above mentioned character, which are simple in construction, inexpensive to manufacture, strong, and durable.

Other objects and advantages of the invention will be apparent during the course of the following description.

In the accompanying drawings forming a part of this specification and in which like numerals are employed to designate like parts throughout the same, Figure 1 is a side elevation of my improved drag-seine, shown in operative position, and, Fig. 2 is a vertical transverse section through the same.

In the drawings, wherein for the purpose of illustration is shown a preferred embodiment of the invention, the numeral 5 designates the body portion of the drag-seine, formed of a net of suitable mesh, as is customary.

Secured to the upper edge of the body portion 5, by any suitable means, is a longitudinal float-carrying line 6, upon which is mounted floats 7, formed of cork or wood, as is customary. Secured to the lower part of the body portion 5 is a second longitudinal line 8, attached thereto by any suitable means. This line extends in substantially parallel relation to the upper line 6, as shown. The ends of the lines 6 and 8 extend outwardly beyond the ends of the body portion 5 for a substantial distance, providing outwardly converging portions 9, as shown.

The body portion 5 extends downwardly beyond the lower longitudinal line 8 for a substantial distance, providing a permanently longitudinally loose or full apron 10, the lower longitudinal edge of which is adapted to engage with the bottom of the river or the like and readily conform to the curvature thereof, to prevent fish or the like from passing beneath the drag-seine. Secured to the lower longitudinal edge of the apron 10 by any suitable means, is a sinker-carrying line 11, upon which are mounted sinkers or leads 12 suitably spaced, as shown. At its opposite ends, the sinker-carrying line 11 extends beyond the ends of the apron 10, providing portions 13 converging outwardly, with the portions 9, as shown. The portions 9 and 13 are bound together at their outer ends, as shown at 14.

The longitudinal lines 6 and 8 are of the same length and are much shorter than the longitudinal sinker-carrying line 11, whereby the lines 6 and 8 receive all of the strain or weight from the drag-seine, when in operation, so that the intermediate portion of the sinker-carrying line 11 is longitudinally full or loose, allowing the same to cause the lower longitudinal edge of the apron 10 to readily conform to irregular surfaces occurring at or near the bottom of the river or the like, as clearly illustrated in Fig. 1.

The portions 9, and 13 form bridles and are preferably provided with loops 15, for attachment with hauling lines, (not shown).

In operation, the hauling lines are secured to the loops 15, and the drag-seines lowered in the river or the like, in the usual manner. The sinker-carrying line 11 causes the lower longitudinal edge of the apron 10 to engage with the bottom of the river, the same being substantially longer than the lines 6 and 8 and remaining longitudinally full or slack and causing the longitudinal edge of the apron 10 to readily conform to the irregularities occurring near or at the bottom of the river. The float-carrying line 6 remains at the surface of the water and travels along the same as the drag-seine is removed, in the usual manner.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having described my invention, I claim:—

1. A drag-seine comprising a body portion, a plurality of longitudinally extending lines connected with the body portion and spaced laterally for a substantial distance with the lower part of said body portion extending downwardly beyond the lower line for a substantial distance to provide a bottom-engaging apron, and a line secured to the lower longitudinal edge of the bottom-engaging apron and being substantially longer than the first named lines.

2. A drag-seine comprising a body portion, a plurality of laterally spaced longitudinally extending lines connected with the body portion, a permanently longitudinally loose apron depending from the body portion and extending downwardly beyond the lower line for a substantial distance, and a longitudinal line connected with the apron near its lower longitudinal edge and having a substantially greater length than the first named lines.

3. A drag-seine comprising a body portion, a float-carrying longitudinal line secured to the body portion near its upper longitudinal edge and extending beyond the opposite ends thereof for a substantial distance, an intermediate longitudinal line secured to the body portion at a point spaced a substantial distance from the float-carrying line and extending beyond the opposite ends of the body portion for a substantial distance and being of substantially the same length as the float-carrying line with its ends secured to the ends thereof, a longitudinally loose apron depending from the body portion and extending downwardly beyond the lower line for a substantial distance, and a sinker-carrying line substantially longer than either of the first named lines and secured to the apron near the free edge thereof with its opposite ends secured to the ends of the first named lines.

In testimony whereof I affix my signature in presence of two witnesses.

ERNEST E. WOODFIELD.

Witnesses:
　FRANK SPITTLE,
　STELLA SPEDDEN.